US008690035B2

(12) United States Patent  (10) Patent No.: US 8,690,035 B2
Silverman  (45) Date of Patent:  Apr. 8, 2014

(54) BACK STRAIN ALLEVIATING FISHING POLE HARNESS

(76) Inventor: Mark S. Silverman, Lake Hpoatcong, NJ (US)

(*) Notice: Subject to any disclaimer, the term of this patent is extended or adjusted under 35 U.S.C. 154(b) by 220 days.

(21) Appl. No.: 12/904,595

(22) Filed: Oct. 14, 2010

(65) Prior Publication Data

US 2011/0108596 A1  May 12, 2011

Related U.S. Application Data

(60) Provisional application No. 61/260,782, filed on Nov. 12, 2009.

(51) Int. Cl.
*A45F 3/04* (2006.01)
*A45F 3/10* (2006.01)
*A45F 3/08* (2006.01)

(52) U.S. Cl.
USPC ............ 224/628; 224/261; 224/907; 224/922

(58) Field of Classification Search
USPC ......... 224/639, 648, 650, 667, 264, 265, 637, 224/643, 261, 907, 922; 43/21.2
See application file for complete search history.

(56) References Cited

U.S. PATENT DOCUMENTS

| | | | | |
|---|---|---|---|---|
| 1,296,619 A | * | 3/1919 | Bulat | 224/160 |
| 2,060,751 A | | 11/1936 | Baxter | |
| 2,271,136 A | * | 1/1942 | Geiger | 224/200 |
| 2,298,694 A | | 10/1942 | Haislip | |
| 2,990,089 A | * | 6/1961 | Nystrom | 224/628 |
| 3,035,747 A | * | 5/1962 | Ullrich, Jr. | 224/265 |
| 3,114,486 A | * | 12/1963 | Flexman | 224/628 |
| 3,774,825 A | * | 11/1973 | Schone et al. | 224/265 |
| 4,498,257 A | | 2/1985 | Jekel | |
| 4,802,612 A | * | 2/1989 | Anderson | 224/625 |
| 4,828,152 A | * | 5/1989 | Pepping | 224/200 |
| 4,858,364 A | * | 8/1989 | Butts | 43/21.2 |
| 5,088,634 A | | 2/1992 | MacLaren | |
| 5,212,901 A | | 5/1993 | Bishop et al. | |
| 5,551,614 A | * | 9/1996 | Ham | 224/264 |
| 5,564,217 A | | 10/1996 | Riedell | |
| 5,626,270 A | * | 5/1997 | Tseng | 224/148.7 |
| 5,662,251 A | | 9/1997 | Rossiter | |
| 5,664,844 A | | 9/1997 | Greene | |
| 5,738,257 A | * | 4/1998 | McConnell | 224/200 |
| 5,813,162 A | | 9/1998 | Tse et al. | |
| 5,855,086 A | | 1/1999 | Pandeles | |
| 5,957,091 A | | 9/1999 | McDonald et al. | |
| 6,185,856 B1 | | 2/2001 | Yakabe | |

(Continued)

*Primary Examiner* — Justin Larson
*Assistant Examiner* — Lester L Vanterpool
(74) *Attorney, Agent, or Firm* — Stetina Brunda Garred & Brucker

(57) ABSTRACT

An apparatus wearable on a torso of a user to support and article such as a fishing rod is disclosed. The apparatus includes a primary panel defined by an external side and an internal side that has a contour substantially conforming to the torso. The primary panel is also defined by a central section interposed between a left peripheral section and a right peripheral section, with the central section including at least one open recess that is receptive to the article. The recess is defined by an outline on the primary panel and a depth that extends into the primary panel. The apparatus also includes at least one harness member that cooperates with the primary panel to secure the same to the torso and redirect horizontal forces against the primary panel to a vertical direction. The harness member is engageable to the shoulders of the user.

16 Claims, 4 Drawing Sheets

(56) References Cited

U.S. PATENT DOCUMENTS

| | | |
|---|---|---|
| 6,237,821 B1 | 5/2001 | Owen |
| 6,267,276 B1 | 7/2001 | Cook |
| 6,412,602 B1 | 7/2002 | Sundman |
| 6,435,614 B1 | 8/2002 | Gollahon |
| 6,557,292 B1 | 5/2003 | Howard |
| 6,591,540 B1 | 7/2003 | Chargois |
| 6,591,542 B1 | 7/2003 | Jordan |
| 6,764,231 B1 * | 7/2004 | Shubert ................ 396/419 |
| 6,869,146 B2 | 3/2005 | Gollahon |
| 6,893,098 B2 | 5/2005 | Kohani |
| 7,013,596 B1 | 3/2006 | Moore |
| 7,059,503 B2 * | 6/2006 | Andersen ............... 224/579 |
| 7,146,763 B1 | 12/2006 | Stanton |
| 7,671,261 B1 * | 3/2010 | Momose ................ 84/421 |
| 2004/0211799 A1 * | 10/2004 | Loughman ............. 224/262 |

* cited by examiner

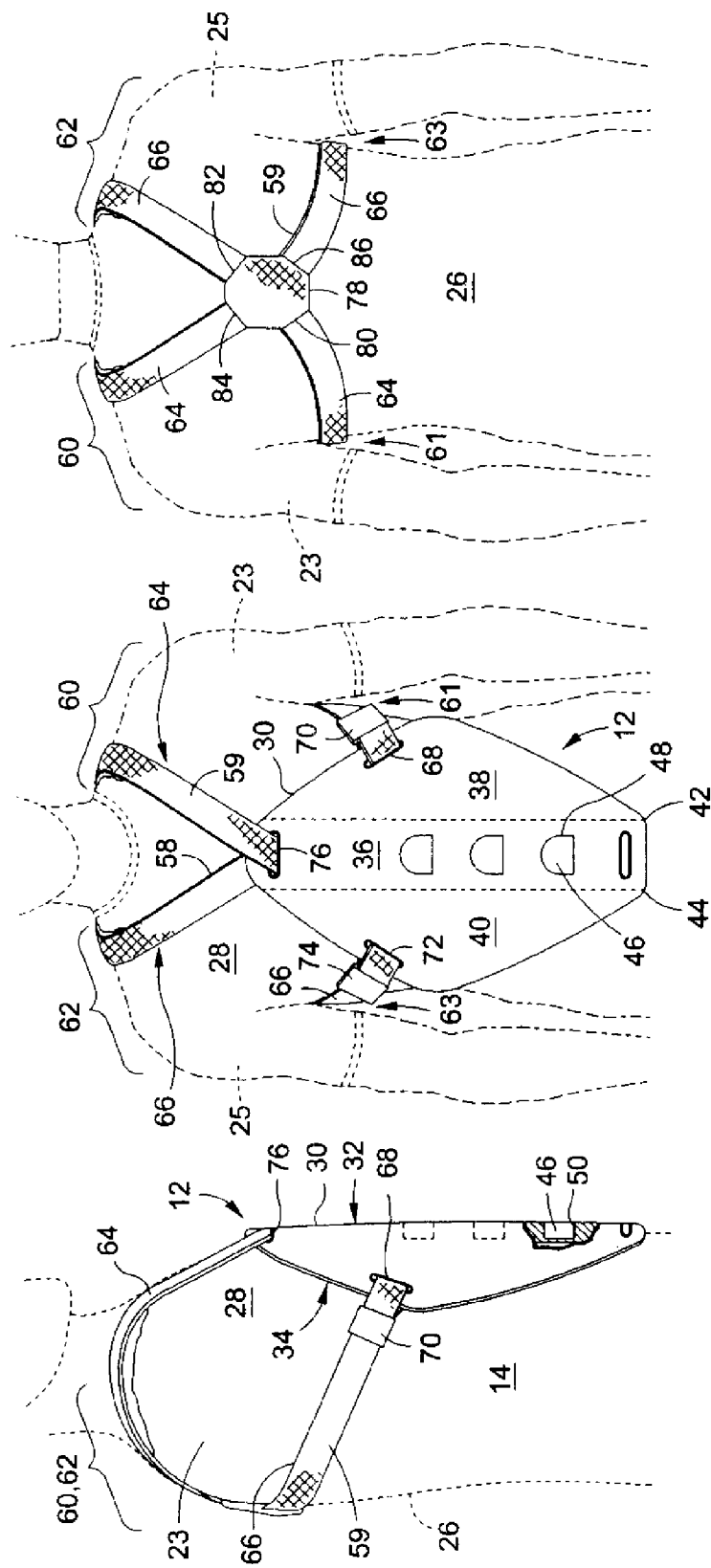

BACK STRAIN ALLEVIATING FISHING POLE HARNESS

CROSS-REFERENCE TO RELATED APPLICATIONS

This application relates to and claims the benefit of U.S. Provisional Application No. 61/260,782, filed Nov. 12, 2009 and entitled A HARNESS THAT ELEVATES BACK STRAIN FOR FISHERMEN OF ALL AGES WHO USE FISHING POLES, which is wholly incorporated by reference herein.

STATEMENT RE: FEDERALLY SPONSORED RESEARCH/DEVELOPMENT

Not Applicable

BACKGROUND

1. Technical Field

The present disclosure relates generally to carrying harnesses and fishing accessories, and more particularly, to a back strain alleviating wearable fishing pole harness.

2. Related Art

Fishing is an activity that has been pursued for generations, primarily for food, though recently for recreational purposes. A wide variety of practices fall under the general category of fishing, including angling, spear-fishing, blast fishing, and so forth. The most popular type of recreational fishing is angling, in which a hook (also referred to as "angle") or other like tackle is attached to an extended, semi-rigid rod by a line. A reel that stores, retrieves, and pays out the line is attached to the base portion of the rod for manipulation by the angler. The hook is dressed with bait or lures to persuade the fish to bite down upon the same, resulting in the capture of the fish. The hook and the bait/lures are cast out to a location in the water where the angler anticipates the fish are congregating using a variety of physically demanding techniques (overhead, underhand, sideways, or variations thereof, depending upon the restrictions imposed by the location and surroundings). Once a bite is detected, the hook is set and the fish is manually reeled back to the angler, also referred to as landing the fish.

This step typically places a greater physical demand on the angler, as it involves repeated bending and straightening of the angler's arms and back. Once hooked, fish have a tendency to resist and fight back against the line being retrieved or pulled back toward the angler. Although conventional fishing lines have substantial tensile strength to withstand such resistance, even for the smallest and weakest of fish, best angling practices still involve a technique by which the tension is distributed to the rod. Specifically, the angler stops spooling the reel while the rod is at a slight angle to surface of the water. Then, the rod is pivoted rearward into an upright position, which pulls the fish closer without decreasing the length of the line. Immediately, the rod is pivoted forward again into the slightly angled position. Typically, at this point, there is a slight slack in the line allowing it to be spooled without much tension. Once further resistance is felt from fish while spooling the reel, the process is repeated. If too much resistance is encountered, the line is released to prevent breakage.

When fishing from a mobile platform such as a boat, the movement of the rod can be restricted to simply forward and backward, as the platform can be rotated left to right to accommodate the movement of the fish. Thus, the rod is maintained in a co-axial relationship to the direction of travel of the fish. However, when fishing from a stationary platform such as a shoreline, the lateral position and angle of the rod relative to the angler must be modified to maintain this co-axial relationship. As such, a sideways pivoting of the rod is also incorporated.

For stronger anglers, these techniques may be adequate because a substantial exertion of the back and abdominal muscles may not be necessary to pivot the rod rearward. However, such a strength advantage may be marginal, particularly with larger and stronger fish or when fishing in unstable platforms such as the aforementioned boat. Pain caused by the over-exertion of muscles, as well as compression and twisting of the spine, is therefore a common affliction amongst anglers. In the worst case, back and spinal injury may result. These effects are exacerbated for those anglers who are advanced in age and/or of weaker strength. Thus, although pursued with the intention of being a relaxing experience, fishing may paradoxically end up being quite unpleasant. Accordingly, there is a need in the art for an improved back strain alleviating wearable fishing pole harness.

BRIEF SUMMARY

In accordance with one embodiment of the present disclosure, there is contemplated an apparatus that is wearable on a torso of a user to support an article such as a fishing rod. Generally, the apparatus is understood to redirect the pressures against the spine commonly associated with fishing and other such applications to the entirety of the body in a vertical, downward direction toward the feet from the shoulders, thereby reducing back and arm strain. These forces would otherwise be exerted horizontally Thus, the likelihood of spinal and other related bodily injury in pursuit of such activities is greatly reduced such that it remains enjoyable to all ages and physical conditions including recreational senior, adult, and younger anglers. In addition to preventing injury, there may be several convenience-related advantages. For instance, the apparatus permits free movement of the fishing rod so that tangling with other lines can be avoided by rapid removal therefrom, while also being capable of rapid reinsertion or re-attachment.

The apparatus may include a primary panel that is defined by an external side and an internal side. The internal side of the primary panel may have a contour that substantially conforms to an abdominal side of the torso. The primary panel is also defined by a central section, which is interposed between a left peripheral section and a right peripheral section. The central section may include at least one open recess that is receptive to the article or the fishing rod, and is defined by an outline on the primary panel and a depth that extends into the primary panel.

Additionally, the apparatus may include at least one harness member that cooperates with the primary panel to secure the primary panel to the torso and to redirect horizontal forces against the primary panel to a vertical direction. The harness member may be engageable to the shoulders of the user. One embodiment contemplates the harness member including a first shoulder strap portion that is engageable to the left peripheral section of the primary panel, and defines a first loop around which a first arm of the user is inserted. It is also contemplated that the harness member includes a second shoulder strap portion that is engageable to the right peripheral section of the primary panel. This may define a second loop around which a second arm of the user is inserted. The first shoulder strap portion and the second shoulder strap portion are contemplated to loop around a back side of the torso. The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 2A is a right side view of the fishing rod support harness shown in FIG. 1;

FIG. 2B is a frontal view of the fishing rod support harness shown in FIG. 1;

FIG. 2C is a back view of the fishing rod support harness shown in FIG. 1;

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, left and right, first and second and the like are used solely to distinguish one entity from another without necessarily requiring or implying any actual such relationship or order between such entities.

Figure 1:
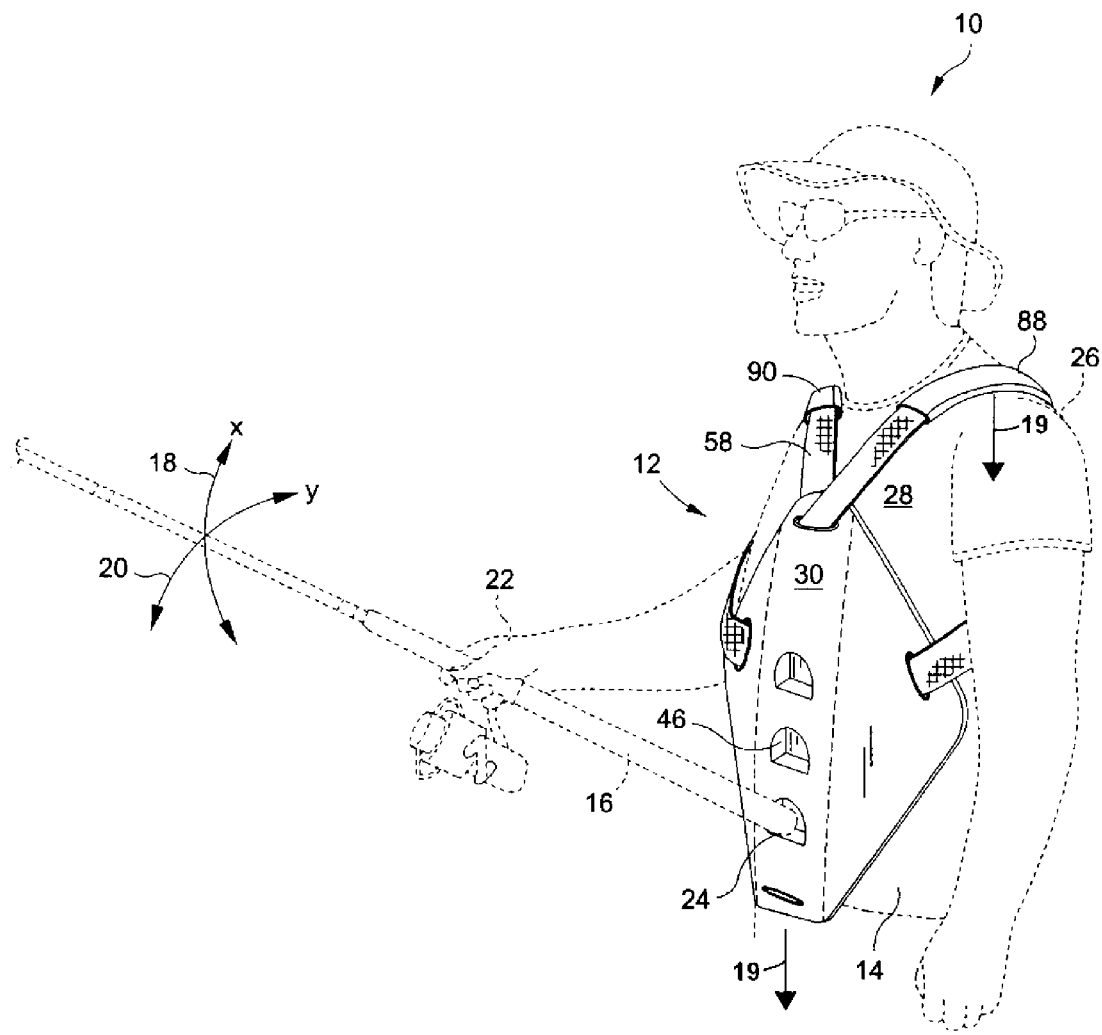
FIG. 1 is a perspective view of one embodiment of a fishing rod support harness worn on a torso of a user including a primary panel and harness members.

With reference to FIG. 1, there is depicted an exemplary user 10 fitted with one embodiment of an apparatus 12 that is wearable on the torso 14 of the user 10. The details of the apparatus 12 will be discussed in the context of fishing, and the fishing-specific term may be utilized interchangeably with the more general term. For example, the apparatus 12 may also be referred to as a fishing rod harness, and the user 10 may be referred to as an angler. Further, such an embodiment is configured to support a fishing rod 16. It will be appreciated that these context-specific terms are for exemplary purposes only and not intended to be limiting. It is expressly contemplated that the apparatus 12 may be used for supporting other articles besides the fishing rod 16, so all disclosed features, regardless of the use of fishing-related terms to describe the same, are understood to be applicable as analogs in other contexts.

According to various embodiments, the fishing rod harness 12 is understood to alleviate back strain for anglers 10 by generally redirecting the pressures imparted on the back from the movement of the fishing rod 16 to a vertical orientation or direction. As illustrated in FIG. 1, a fighting fish is understood to exert forces along the x-axis 18 (side-to-side) as well as the y-axis 20 (up-down) with the pivot point either being the point of contact between a hand 22 of the angler 10 and the fishing rod 16, or a butt 24 thereof. Without the presently contemplated fishing rod harness 12, these forces are exerted upon the back 26 of the angler 10 in a horizontal direction, causing the back to bend and twist.

The fishing rod harness 12 may be worn on the abdomen 28 of the angler 10. The present disclosure employs the term abdomen to refer generally to the frontal portion of the torso 14, though it will be understood that this may also include the chest, thorax, and the pelvis. As best illustrated in FIGS. 2A and 2B, the fishing rod harness 12 includes a primary panel 30 that can receive the fishing rod 16. The primary panel 30 is generally defined by an external side 32 that faces away from the abdomen 28, and an opposed internal side 34 that is positioned against the abdomen 28. In this regard, the opposed internal side 34 can have a contour that substantially conforms to the abdomen 28.

In accordance with one embodiment, the primary panel 30 is characterized by a central section 36, a left peripheral section 38 and a right peripheral section 40. As shown in FIG. 2B, the central section 36 is interposed between the left peripheral section 38 and the right peripheral section 40. Further, the central section 36 extends along the entire length of the primary panel 30. Generally, the central section 36 is separated from the left peripheral section 38 along a first bend axis 42, and from the right peripheral section 40 along a second bend axis 44. With the central section 36 extending substantially parallel to the torso, the left peripheral section 38 and the right peripheral section 40 are understood to be angled slightly therefrom. The first bend axis 42 and the second bend axis 44 are shown by way of example only, and the particular contour and bend between the central section 36 and the respective one of the left and right peripheral sections 38, 40 may be varied to achieve different appearances. In one particular embodiment, however, an angle of 45 degrees between the central section 36, and each of the left and right peripheral sections 38, 40, is contemplated.

Based upon the size of the average angler 10, the primary panel 30 may have approximate dimensions of 14 inches by 11 inches. It will be appreciated, however, that the primary panel 30 may have any set of dimensions to accommodate various body sizes, while being sized to support the weight of the fishing rod 16 as well as any forces exerted by the fighting fish. One embodiment contemplates the primary panel 30 has a unitary construction, though for portability, it may be construction in multiple sections that may be subsequently expanded for deployment. The fishing rod harness 12 is intended to be worn for extended periods of time in marine environments, which are typically corrosive due to salt water and involve substantial temperature swings. Further, equipment used in connection with fishing, and any outdoor activity for that matter, is typically subject to rough handling and abuse. Therefore, the primary panel 30 may be constructed of any lightweight, resilient, and waterproof material such as plastic, acrylic, and the like. Thus, the primary panel 30 may be constructed by any plastics manufacturer, utilizing a template that stamps out the outline thereof along with several openings as will be described in greater detail below. Once such a flat sheet is produced, it may be heated and bent to produce the aforementioned contours. For custom fitment, the step of bending the contours of the primary panel 30 may be performed for each individual angler 10. Decorative enhancements may also be affixed to the surface of the primary panel 30. Several of the techniques involved in the foregoing process are well known in the art, and those having ordinary skill will be able to readily ascertain such techniques.

The central section 36 includes at least one open recess 46 that is receptive to the fishing rod 16. FIG. 2B best illustrates the recess 46 being defined by an outline 48 on the primary panel 30. Furthermore, FIG. 2A best illustrates the recess 46 being defined by a depth 50 extending into the primary panel 30. The recess is sized and configured to receive the butt end 24 of the fishing rod 16, which is frictionally retained by pressure imparted upon the same. The recess 46 can be approximately one inch to one and a half inches, which is understood to be the common width of the fishing rod 16.

Various embodiments contemplate there being multiple ones of the recesses 46 that are arranged in a spaced relationship up and down the central section 36. It will be appreciated that multiple recesses 46 are included to allow different positions of the fishing rod 16 depending upon the comfort needs of the angler 10.

Figure 3A:
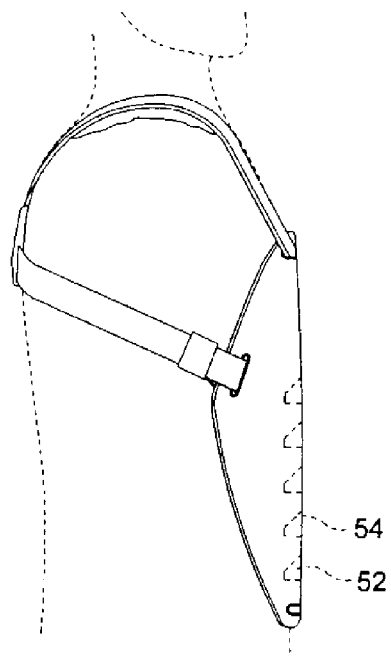
FIG. 3A is a right side view of a second embodiment of the fishing rod support harness including an alternative configuration of recesses of the primary panel.
Figure 3B:
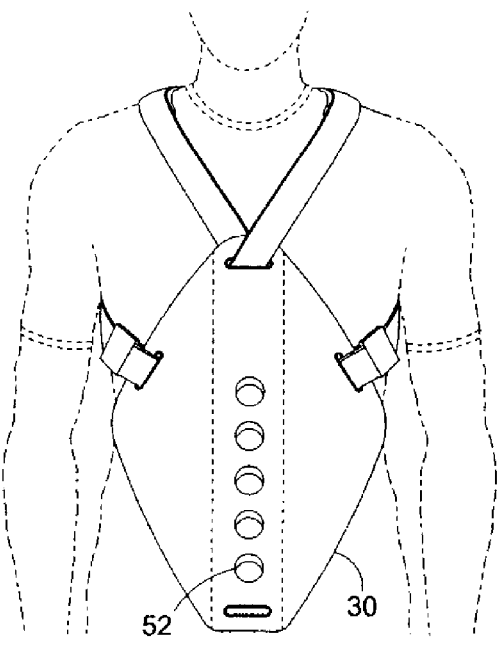
FIG. 3B is a frontal view of the second embodiment of the fishing rod support harness shown in FIG. 3A.
Figure 4A:
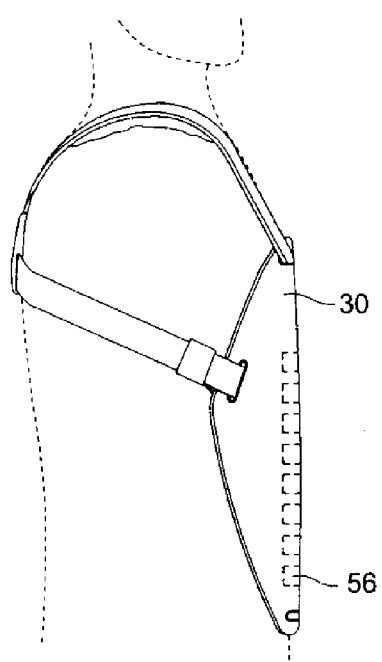
FIG. 4A is a right side view of a third embodiment of the fishing rod support harness including another alternative configuration of the recesses of the primary panel.
Figure 4B:
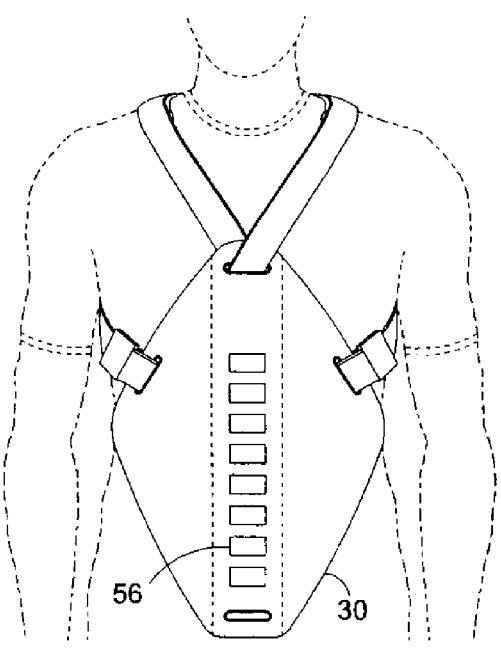
FIG. 4B is a frontal view of the third embodiment of the fishing rod support harness shown in FIG. 4A.

As indicated above, the recesses 46 are for holding the fishing rod 16 in a comfortable position. There are a variety of different ways in which the recesses 46 can be configured to achieve this objective, and the embodiments disclosed herein showing such configurations are presented by way of example only and not of limitation. In the embodiment of the fishing rod harness 12 illustrated in FIGS. 1, 2A and 2B, the recess 46 has a semi-circular outline 48. It is understood that the circular portion thereof allows the fishing rod 16 to be rotated with greater ease, while the flat portion thereof limits further movement beyond perpendicular to the primary panel 30. In another embodiment illustrated in FIGS. 3A and 3B, recesses 52 have a completely circular profile, and an oblique depth 54. That is, the recess 52 is angled slightly upward to accommodate the preferred carry mode of angling the fishing rod 16 upwards. In yet another embodiment illustrated in FIGS. 4A and 4B, recesses 56 have a rectangular profile, and a perpendicular depth. Furthermore, instead of recesses 52 that extend into the primary panel 30, there may be protrusions that extend outwards from the same. Again, the foregoing configurations are only exemplary, and equivalent alternatives are deemed to be within the scope of the present disclosure.

Referring again to FIG. 1, the fishing rod harness 12 of the present disclosure is also contemplated to include at least one harness member 58 cooperating with the primary panel 30 to secure the same to the torso 14, and to redirect horizontal forces against the primary panel to a vertical direction. In this regard, as the fishing rod 16 exerts forces upon the primary panel 30 in the manner discussed above, i.e., the forces in the x-direction 18 and the y-direction 20, such forces are transferred to the primary panel 30 via the recess 46. This force or pressure is then redirected to a vertical axis 19 against the left shoulder 60 and the right shoulder 62 of the angler 10 through the torso 14 and to the feet via the harness member 58. This configuration is also understood to distribute such forces evenly across the torso 14 while avoiding pressure points. Accordingly, the leaning back and bending over body actions described above as being problematic is lessened because the fishing rod 16 is closer to a vertical orientation, and decreases the load on the upper and lower back of the angler 10.

As shown in FIG. 2B, the harness member 58 is engageable to the left shoulder 60, as well as the right shoulder 62 of the angler 10. More particularly, the harness member 58 is defined by a first shoulder strap portion 64 that loops around the left shoulder 60 and under the left armpit 61. The first shoulder strap portion 64, together with the primary panel 30, thus defines a loop through which the left arm 23 is inserted. The harness member 58 is also defined by a second shoulder strap portion 66 that loops around the right shoulder 62 and under the right armpit 63. Likewise, the second shoulder strap portion 66, together with the primary panel 30, defines a loop through which the right arm 25 is inserted. The left peripheral section 38 of the primary panel 30 defines a first strap slot 68, through which the first shoulder strap portion 64 is threaded. A first buckle 70 or clasp adjustably retains the first shoulder strap portion 64. Relatedly, the right peripheral section 40 of the primary panel 30 defines a second strap slot 72, through which the second shoulder strap portion 66 is threaded, with a second buckle 74 or clasp that adjustably retains the second shoulder strap portion 66. Although a slip lock buckle may be utilized for the first buckle 70 and the second buckle 74, any other adjustable retention modality known in the art may be readily substituted. The central section 36 of the primary panel 30 may also include a central strap slot 76 through which the first shoulder strap portion 64 and the second shoulder strap portion 66 is threaded to complete the aforementioned loop.

In one embodiment of the fishing rod harness 12, the harness member 58 may be a single, continuous strip of fabric or webbing material of sufficient length to loop around the torso 14 in the manner described above. This single strip may also be referred to as a strap 59, and may be flat and approximately one inch in width. Any suitable material having resiliency and flexibility may be utilized therefor, including nylon, Dacron® Lycra®, and so forth. Depending upon the way in which this strap 59 is looped around the left shoulder 60 and the right shoulder 62, the first shoulder strap portion 64 and the second shoulder strap portion 66 may not be contiguous. It will therefore be appreciated that the first shoulder strap portion 64 and the second shoulder strap portion 66 are referenced in the most general sense as the components that define the loop through which a respective one of the left and right arms 23, 25 are to be positioned. Different sections of such a strap 59 may be part of the first or second shoulder strap portion 64, 66. Notwithstanding the express disclosure of the harness member 58 comprised of the strap 59, other variations thereof are also envisioned to be within the scope of the present disclosure.

As best illustrated in FIG. 2C, the harness member 58 may further include a back cross clasp 78 which interconnects the first shoulder strap portion 64 and the second shoulder strap portion 66. In further detail, with reference to FIG. 2B, one end of the strap 59 may be threaded through the first strap slot 68 and thus attached to the left peripheral section 38 of the primary panel 30. Thereafter, the strap 59 loops under the left armpit 61 and around the torso 14 to the back 26, and is threaded through a lower left end 80 of the back cross clasp 78 as shown in FIG. 2C. The strap 59 extends diagonally across to an upper right end 82 of the back cross clasp 78, loops around and over the right shoulder 62, and to the central strap slot 76. As shown in FIG. 2B, the strap extends over and around the left shoulder 60, and is threaded through an upper left end 84 of the back cross clasp, and extends diagonally toward a lower right end 86. The strap 59 continues to loop around the torso 14 from the back 26 toward the abdomen 28, and secured to the right peripheral section 40 by threading through the second strap slot 72 and retained by the second buckle 74.

As noted above, the overall working length of the strap 59 is adjustable to fit the torso 14 of the angler 10 by manipulating the first buckle 70 and the second buckle 72. The length of the strap 59 is adjusted accommodate anglers of varying heights and girth, and for comfort. It is understood that the length of slack from the first buckle 70 and the second buckle 72 are substantially the same, and other adjustments may be made in relation to the back cross clasp 78. Along these lines, the strap 59 has sufficient length to be configured in the manner described above. With the above-described harness member 58, it is understood that the fishing rod harness 12 is readily removable and attachable to and from the torso 14, thereby facilitating movement about the fishing platform. Adjustments are likewise quick to make, and the fishing rod 16, as mentioned previously, can be raised and lowered without much exertion by the angler 10.

With reference again to FIG. 1, in one configuration, the fishing rod harness 12 may include a left shoulder pad 88 and a right shoulder pad 90 that is mounted to the harness member 58 at the point where there is contact with the left shoulder 60 and the right shoulder 62, respectively. The shoulder pads 88, 90 may be particularly suitable for long and strenuous fishing sessions involving heavier fish and tackle, or if some degree of sun protection of the shoulders is desired. Additionally, it is also contemplated that the harness member 58 be mounted to a life vest in a matter similar to that described above, except by utilizing the existing straps thereon.

Figure 5A:
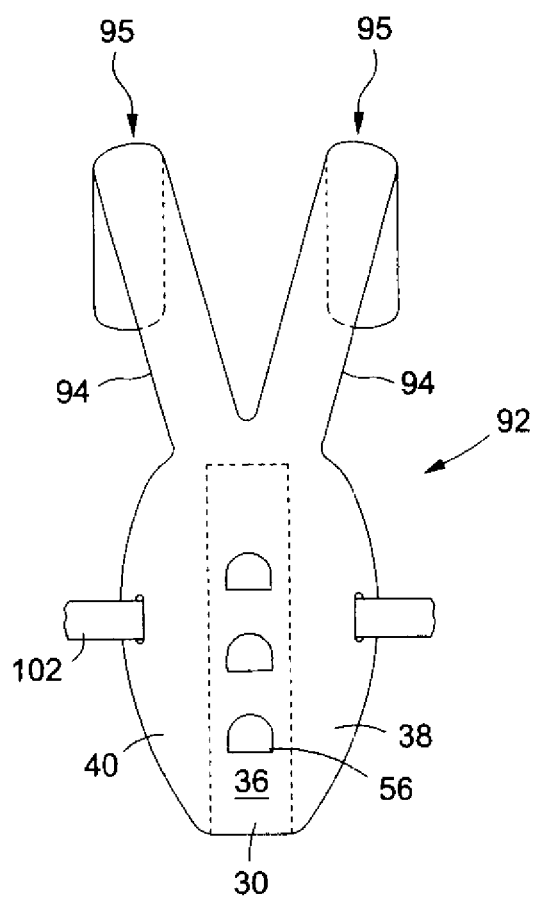
FIG. 5A is a frontal view of a fourth embodiment of the fishing rod support harness including an alternative configuration of the harness members.
Figure 5B:
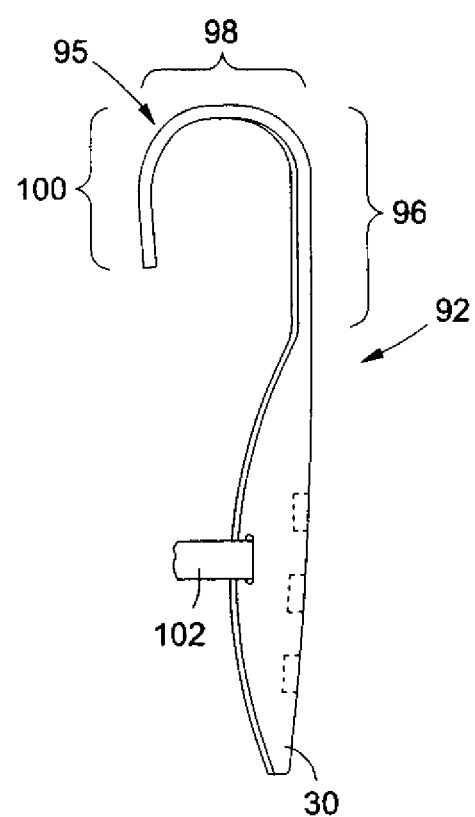
FIG. 5B is a right side view of the fourth embodiment of the fishing rod support harness shown in FIG. 5B.

Having considered one variation that utilizes the straps 59 as the harness member 58, another embodiment of the fishing rod harness 92 employing an alternative to the straps 59 will now be discussed with reference to FIGS. 5A and 5B. In further detail, this embodiment likewise includes the primary panel 30 that is characterized by the central section 36 interposed between the left peripheral section 38 and a right peripheral section 40. Additionally, the central section 36 includes the recesses 56 that are configured to receive the fishing rod 16 as discussed above. The harness member 58, however, is a pair of hooked arms 94 that extend from the primary panel 30.

In one embodiment, the hooked arms 94 are integrally formed with the primary panel 30 in a unitary construction, although separate fabrication and subsequent attachment by any number of well-recognized modalities are also contemplated. The hooked arms 94 are slightly angled outwards to its vertical extent 95, while converging at the central section 36 in a V-shaped configuration. As best illustrated in FIG. 5B, the hooked arms 94 have a front vertical section 96. At the vertical extent 95, the hooked arms 94 bend perpendicularly and define a horizontal middle section 98 that bends to a rear vertical section 100. This U-shaped configuration of the hooked arms 94 permits the primary panel 30 to be suspended from the shoulders 60, 62 in a mariner similar to the modality discussed in relation to the first embodiment of the fishing rod harness 12. In this regard, the size and shape of the hooked arms 94 are configured to fit an average-sized angler 10, though custom fitting for each specific angler 10 is also possible.

Again, the horizontal forces exerted by the fishing rod 16, including those along the x-axis 18 and the y-axis 20, are transferred to the primary panel 30. These forces are then exerted vertically against the shoulders 60, 62 via the hooked arms 94, and specifically the horizontal middle section 98. To provide additional stability, a waist-level belt 102 that extends around the torso 14 in a looping relationship may also be included.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An apparatus wearable on a torso of a user to support an article, the apparatus comprising:
    a primary panel defined by an external side, an internal side having a contour substantially conforming to an abdominal side of the torso, and a central section interposed between a left peripheral section and a right peripheral section, the central section including a plurality of open recesses in a spaced relationship aligned in a single column with each being receptive to the article and defined by a semi-circular outline having a circular top section and a flat bottom section on the primary panel and a depth extending into the primary panel, the central section being further defined by a tapered top end apex, through which a center axis spanning a length of the central section and intersecting centers of each of the plurality of the open recesses extend; and
    at least one harness member cooperating with the primary panel to secure the primary panel to the torso and redirect horizontal forces against the primary panel to a vertical direction, the harness member being engageable to the left and right shoulders of the torso and coupled to an attachment point on the top end apex with the harness member defining extension vertices symmetrically intersecting the center axis at the attachment point.

2. The apparatus of claim 1, wherein the harness member includes:
    a first shoulder strap portion engageable to the left peripheral section of the primary panel to define a first loop around which a first arm of the user is inserted; and
    a second shoulder strap portion engageable to the right peripheral section of the primary panel to define a second loop around which a second arm of the user is inserted;
    wherein the first shoulder strap portion and the second shoulder strap portion loop around a back side of the torso.

3. The apparatus of claim 2, further comprising a back cross clasp, the first shoulder portion and the second shoulder strap portion being threaded through the back cross clasp.

4. The apparatus of claim 2, wherein working lengths of the first shoulder strap portion and the second shoulder strap portion are adjustable to fit the torso of the user.

5. The apparatus of claim 2, wherein:
    the left peripheral section of the primary panel defines a first strap slot through which the first shoulder strap portion is threaded; and
    the right peripheral section of the primary panel defines a second strap slot through which the second shoulder strap portion is threaded.

6. The apparatus of claim 2, wherein the first shoulder strap portion and the second shoulder strap portion is a single, continuous fabric strip.

7. The apparatus of claim 6, wherein top end apex defines a combination strap slot through which the fabric strip including the first shoulder strap portion and the second shoulder strap portion is threaded.

8. The apparatus of claim 1, wherein,
   the central section of the primary panel is substantially parallel to the torso, and
   the left peripheral section and the right peripheral section are in an opposed angled relation to the central section.

9. The apparatus of claim 1, wherein the central section extends along the entire length of the primary panel.

10. The apparatus of claim 1, wherein the primary panel has a unitary construction of plastic.

11. The apparatus of claim 1, wherein the central section of the primary panel defines multiple ones of the recesses arranged in a spaced relationship.

12. The apparatus of claim 1, wherein the outline of the recess is semi-circular with a bottom oriented flat portion.

13. The apparatus of claim 1, wherein the profile of the recess is rectangular.

14. The apparatus of claim 1, wherein the depth of the recess is oblique.

15. The apparatus of claim 1, wherein:
   the article is a fishing rod having a butt end insertable into the recess; and
   the recess being sized and configured to receive the butt end of the fishing rod.

16. The apparatus of claim 1, further comprising shoulder pads attachable to the first shoulder strap portion and the second shoulder strap portion.

* * * * *